(12) United States Patent
Frank

(10) Patent No.: US 6,685,124 B2
(45) Date of Patent: Feb. 3, 2004

(54) SEAT BELT PRETENSIONER WITH BRAKE

(75) Inventor: Matthew C. Frank, Rochester Hills, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 104 days.

(21) Appl. No.: 09/998,627

(22) Filed: Nov. 30, 2001

(65) Prior Publication Data

US 2003/0102659 A1 Jun. 5, 2003

(51) Int. Cl.[7] .................. B60R 22/46; B60R 22/343
(52) U.S. Cl. ............... 242/374; 242/382.1; 242/390.8; 280/806; 280/807; 180/268
(58) Field of Search ............... 242/374, 382.1, 242/390.8, 390.9; 280/806, 807; 180/268; 297/478, 480

(56) References Cited

U.S. PATENT DOCUMENTS

| | | |
|---|---|---|
| 4,655,312 A | 4/1987 | Frantom et al. |
| 4,666,097 A | 5/1987 | Tsuge et al. |
| 4,895,317 A | 1/1990 | Rumpf et al. |
| 5,558,370 A | 9/1996 | Behr |
| 5,718,451 A | 2/1998 | White |
| 5,826,683 A | 10/1998 | Murata et al. |
| 6,216,973 B1 | 4/2001 | Bauer |
| 6,439,494 B1 * | 8/2002 | Specht et al. ............ 242/379.1 |

* cited by examiner

Primary Examiner—John M. Jillions
(74) Attorney, Agent, or Firm—Tarolli, Sundheim, Covell & Tummino L.L.P.

(57) ABSTRACT

An apparatus (10) for helping to protect an occupant of a vehicle seat (14) comprises a seat belt (20) and a seat belt retractor (30) including a spool (60) supported for rotation about a spool axis (64) in a seat belt withdrawal direction (68) and an opposite seat belt retraction direction (66). An electric motor (110) is energizable to rotate the spool (60) in the seat belt retraction direction (66) and is de-energizable. The electric motor (110) is energizable to rotate the spool (60) in the seat belt retraction direction (66) to apply a predetermined amount of tension to the seat belt (20). An electrically actuatable brake (140) associated with the motor (110) is actuatable to maintain the predetermined amount of tension on the seat belt (20) after the motor applies the predetermined amount of tension to the seat belt.

38 Claims, 7 Drawing Sheets

SEAT BELT PRETENSIONER WITH BRAKE

BACKGROUND OF THE INVENTION

1. Technical Field

The present invention relates to a vehicle occupant protection system. In particular, the present invention relates to a vehicle seat belt system having an electric motor driven pretensioner.

2. Description of the Prior Art

A typical vehicle seat belt system includes a length of seat belt webbing wound on a spool of a seat belt webbing retractor. The seat belt webbing is extensible about a vehicle occupant for helping to protect the occupant in the event of a vehicle crash condition. The spool rotates in a belt withdrawal direction as the occupant withdraws seat belt webbing from the retractor. A rewind spring is connected with the spool and biases the spool for rotation in an opposite belt retraction direction.

It is known to use a pretensioner to remove slack from seat belt webbing in the event of a vehicle crash condition. Typically, a pretensioner includes a pyrotechnic device that is actuated when a crash condition is sensed. After actuation of the pyrotechnic device, the pretensioner must be replaced.

Some seat belt systems use an electric motor to pretension the belt webbing. If an electric motor is used to pretension belt webbing, the motor can tend to overheat if it remains energized in a stall condition maintaining tension on the belt webbing.

SUMMARY OF THE INVENTION

The present invention is an apparatus for helping to protect an occupant of a vehicle seat. The apparatus comprises a seat belt and a seat belt retractor including a spool supported for rotation about a spool axis in a seat belt withdrawal direction and an opposite seat belt retraction direction. The apparatus includes a pretensioner energizable to rotate the spool in the seat belt retraction direction to apply a predetermined amount of tension to the seat belt. The apparatus also includes a first mechanism to maintain the predetermined amount of tension on the seat belt after the pretensioner applies the predetermined amount of tension to the seat belt. The apparatus further includes a second mechanism to block rotation of the spool in the seat belt withdrawal direction. The second mechanism is actuatable if the tension on the seat belt exceeds the predetermined amount.

In a preferred embodiment, the apparatus includes an electric motor energizable to rotate the spool in the seat belt retraction direction and de-energizable. The electric motor is energizable to rotate the spool in the seat belt retraction direction to apply a predetermined amount of tension to the seat belt. The apparatus also includes an electrically actuatable brake associated with the motor. The brake is actuatable to maintain the predetermined amount of tension on the seat belt after the motor applies the predetermined amount of tension to the seat belt.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
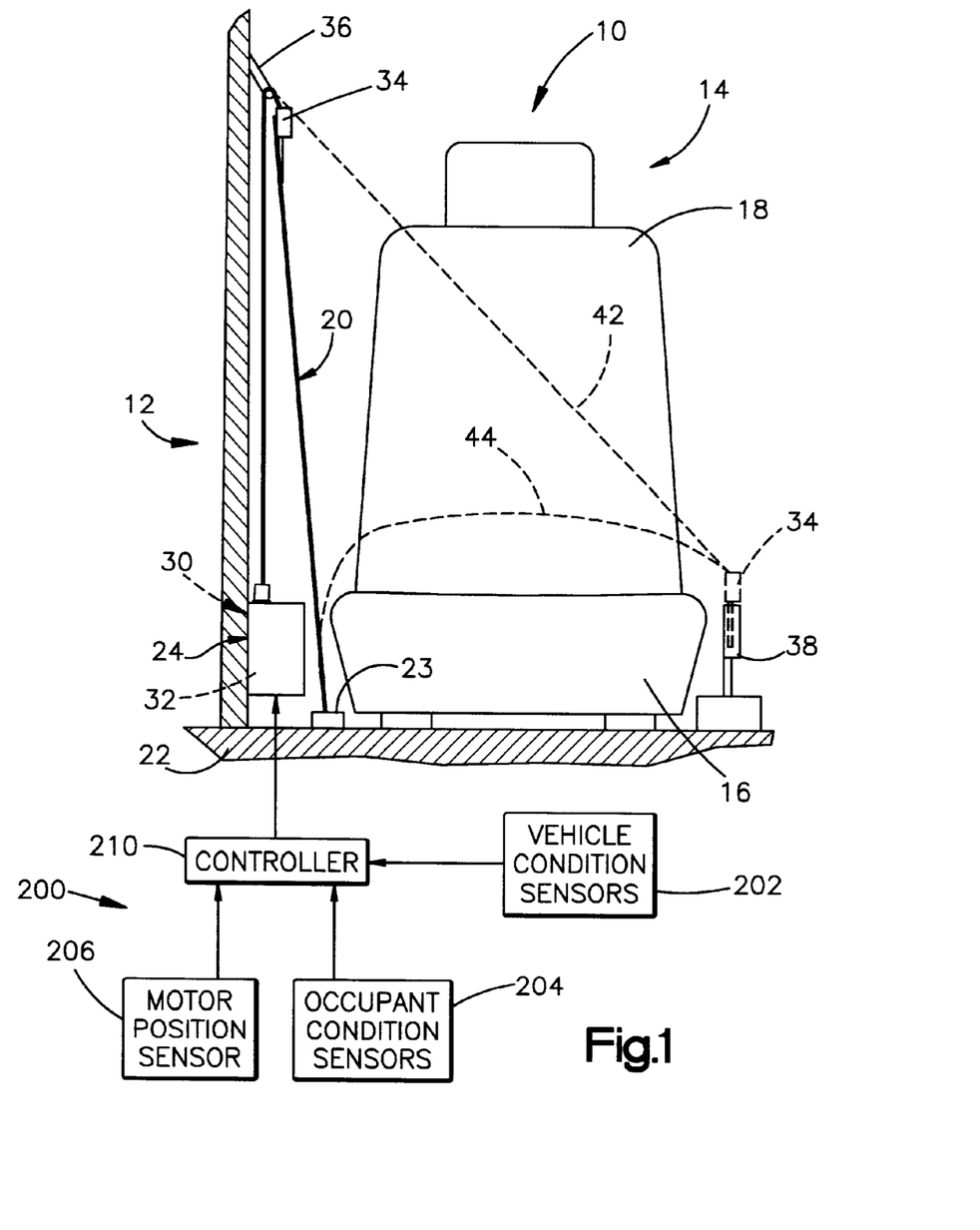
FIG. 1 is a schematic illustration of a vehicle occupant protection system constructed in accordance with the present invention.

The present invention relates to a vehicle occupant protection system. In particular, the present invention relates to a vehicle occupant protection system having an electric motor driven pretensioner. The present invention is applicable to various occupant protection system constructions. As representative of the present invention, FIG. 1 illustrates a vehicle occupant protection system 10 constructed in accordance with a first embodiment of the present invention. The system 10 illustrated in FIG. 1 is a three-point continuous loop seat belt system for use in helping to protect an occupant of a vehicle 12 seated in a vehicle seat 14.

The vehicle seat 14 is illustrated as a front passenger seat of the vehicle 12. The vehicle seat 14 includes a seat bottom portion 16 and a seat back portion 18. Ideally, when seated on the vehicle seat 14, an occupant 12 of the vehicle will be seated on the seat bottom portion 16 with the occupant's back against the seat back portion 18.

The seat belt system 10 includes a length of seat belt webbing 20 that is extensible about the seated occupant 12. One end of the length of belt webbing 20 is anchored to the vehicle body 22 at an anchor point 23 located on one side of the seat 14. The opposite end of the belt webbing 20 is attached to a pretensioner and retractor assembly 24. The assembly 24 includes a seat belt webbing retractor 30 and a pretensioner 32. The assembly 24 is secured to the vehicle body 22 on the same side of the seat 14 as the anchor point 23. A tongue assembly 34 is attached to the belt webbing 20 intermediate the ends of the belt webbing 20. The position of the tongue assembly 34 relative to the ends of the belt webbing 20 is adjustable.

A D-ring or turning guide 36 is mounted to a portion of the vehicle body 22, illustrated as a B-pillar in FIG. 1, in a position above the assembly 24. The belt webbing 20 extends from the anchor point 23 and through the D-ring 36 before entering the retractor 30. The seat belt system 10 also includes a buckle 38 that is anchored to the vehicle body 22 on a side of the seat 14 opposite the anchor point 23.

When the seat belt system 10 is not in use, the belt webbing 20 is stored in the retractor 30 and is oriented generally vertically on one side of the seat 14, as shown in solid lines in FIG. 1. To engage the seat belt system 10, the tongue assembly 34 is manually grasped and is pulled across the lap and torso of the occupant 12 seated in the seat 14. As the tongue assembly 34 is pulled, a portion of the belt webbing 20 unwinds from the retractor 30. The tongue assembly 34 is latched in the buckle 38, as shown in dashed lines in FIG. 1.

When the seat belt system 10 is latched or buckled, the length of belt webbing 20 is divided into a torso portion 42 and a lap portion 44. The torso portion 42 extends from the D-ring 36 to the tongue assembly 34 and extends across the torso of the occupant 12. The lap portion 44 extends from the tongue assembly 34 to the anchor point 23 and extends across the lap of the occupant 12. The remainder of the belt webbing 20, not forming the torso portion 42 or the lap portion 44, extends from the D-ring 36 into the retractor 30.

During movement of the tongue assembly 34 toward the buckle 38, the tongue assembly moves along the belt webbing 20. The movement of the tongue assembly 34 assures that the lap portion 44 of the belt webbing 20 fits snugly across the lap of the occupant 12.

Figure 2:
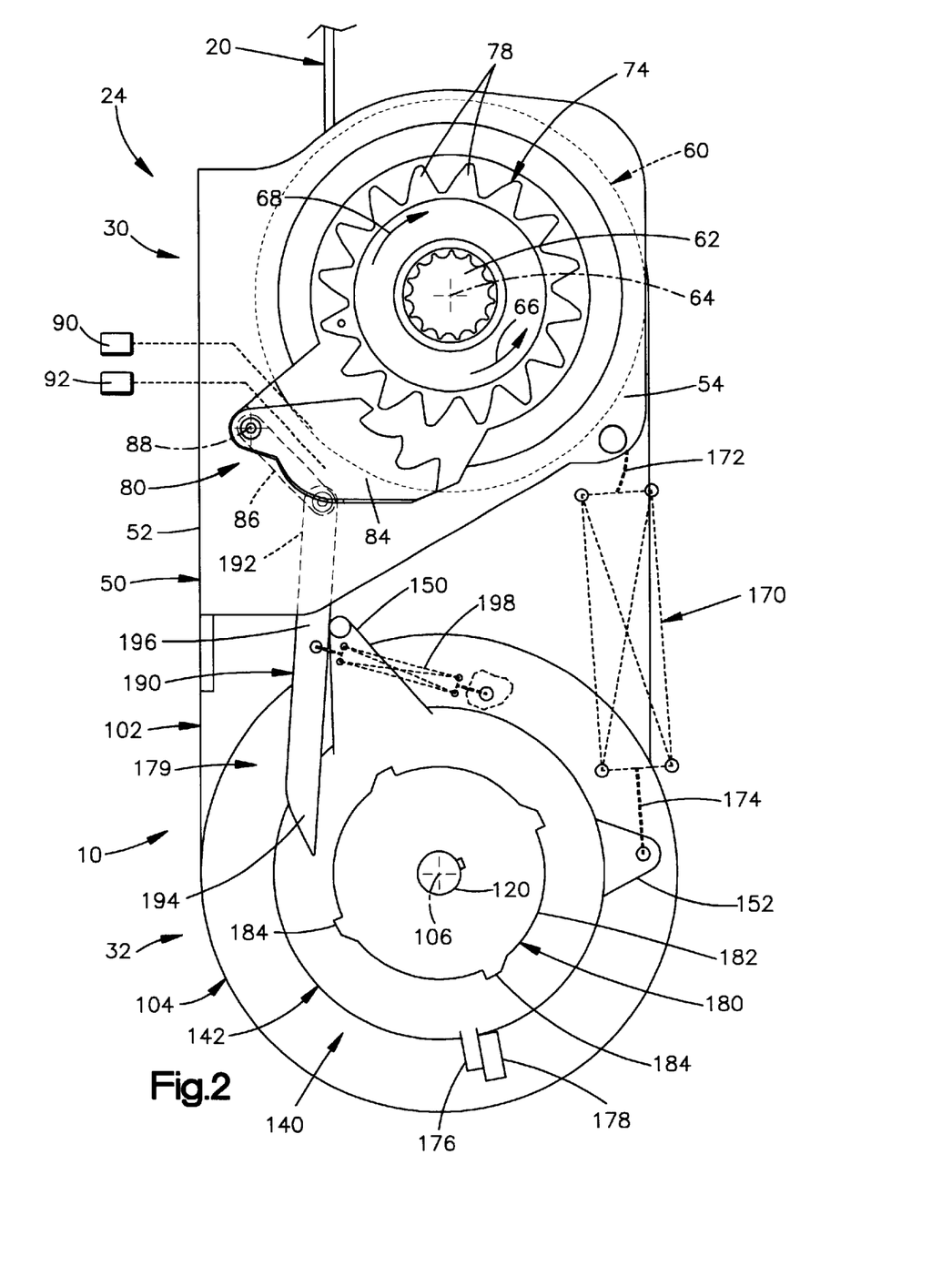
FIG. 2 is a front elevational view of a retractor and pretensioner assembly included in the vehicle occupant protection system of FIG. 1.
Figure 3:
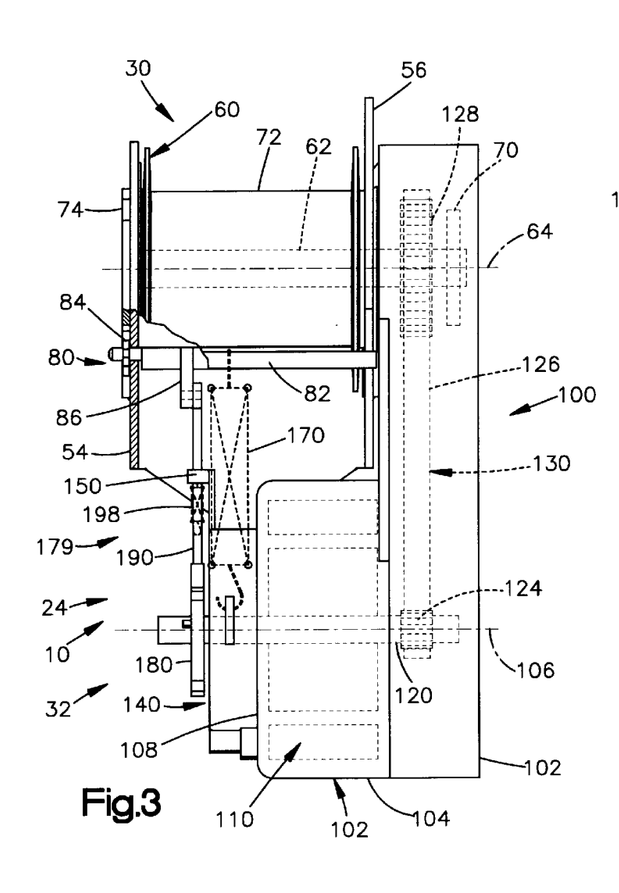
FIG. 3 is a side elevational view, partially cut away and partially schematic, of the retractor and pretensioner assembly of FIG. 2.

The assembly 24 (FIGS. 2–4) includes a base 50 that is fixed to the vehicle body in a manner not shown. The base 50 is a single piece of sheet metal stamped and formed to a U-shaped configuration as seen in FIGS. 2 and 3. The base 50 includes a back wall 52 (FIG. 2) and spaced parallel side walls 54 and 56 (FIG. 3) that extend generally perpendicular to the back wall.

The retractor 30 includes a spool 60 that is fixed for rotation on a shaft 62. The shaft 62 is supported on the base 50 in a manner not shown for rotation relative to the base about a spool axis 64, in a seat belt retraction direction 66 and in an opposite seat belt withdrawal direction 68. A rewind spring mechanism shown schematically at 70 (FIG. 3) is connected with the shaft 62. The rewind spring 70 biases the shaft 62 and the spool 60 for rotation in the belt retraction direction 66.

The spool 60 includes a cylindrical sleeve 72 and a spool locking ratchet wheel 74 fixed to one axial end of the sleeve. The spool locking ratchet wheel 74 has on its perimeter a plurality of circumferentially spaced ratchet teeth 78. An end portion of the seat belt webbing 20 is wound on the sleeve 72 of the spool 60 in a manner not shown. The seat belt webbing 20 extends from one side of the spool 60 as shown in FIG. 2.

In normal operation of the seat belt system 10, when tensile force is exerted on the belt webbing 20 tending to pull the belt webbing out from the retractor 30, the spool 60 rotates in the belt withdrawal direction 68, against the bias of the rewind spring 70. When the tensile force on the belt webbing 20 is released, the rewind spring 70 rotates the spool 60 in the belt retraction direction 66 with a small amount of force (typically about one pound), winding belt webbing back onto the spool of the retractor 30.

A lock pawl assembly 80 is disposed adjacent to the spool locking ratchet wheel 74. The lock pawl assembly 80 includes a cross bar 82 that is fixed to a locking pawl 84. The locking pawl 84 is adjacent to the ratchet wheel 74. The lock pawl assembly 80 also includes a link lever 86 that extends from and is fixed for movement with the cross bar 82.

The lock pawl assembly 80 is supported on the base 50 for pivotal movement about an axis 88 that is spaced from and extends parallel to the spool axis 64. The lock pawl assembly 80 is pivotable from an unlocked position shown in FIG. 2 to a locked position shown in FIG. 5B, to block withdrawal of belt webbing 20 from the retractor 30.

The retractor 30 may include an inertia sensitive locking mechanism as shown schematically at 90. The inertia sensitive locking mechanism 90 is connected with the lock pawl assembly 80 in a manner not shown. The inertia sensitive locking mechanism 90 is operative in a known manner to move the lock pawl assembly 80 from the unlocked position to the locked position in response to sudden vehicle deceleration, for example, to block withdrawal of belt webbing 20 from the retractor 30.

The retractor 30 may also include a webbing sensitive locking mechanism as shown schematically at 92. The webbing sensitive locking mechanism 92 is connected with the lock pawl assembly 80 in a manner not shown. The webbing sensitive locking mechanism 92 is operative in a known manner to move the lock pawl assembly 80 from the unlocked position to the locked position in response to withdrawal of belt webbing 20 from the retractor 30 at a high rate of speed to help protect the vehicle occupant.

The pretensioner 32 (FIGS. 2–4) includes an electric motor drive assembly 100 for selectively rotating the spool 60 in the belt retraction direction 66. The electric motor drive assembly 100 includes a drive housing 102 fixed to the base 50 on a side of the side wall 56 opposite the spool 60. The drive housing 102 extends away from the spool axis 64, in a downward direction as viewed in FIG. 2.

Figure 4:
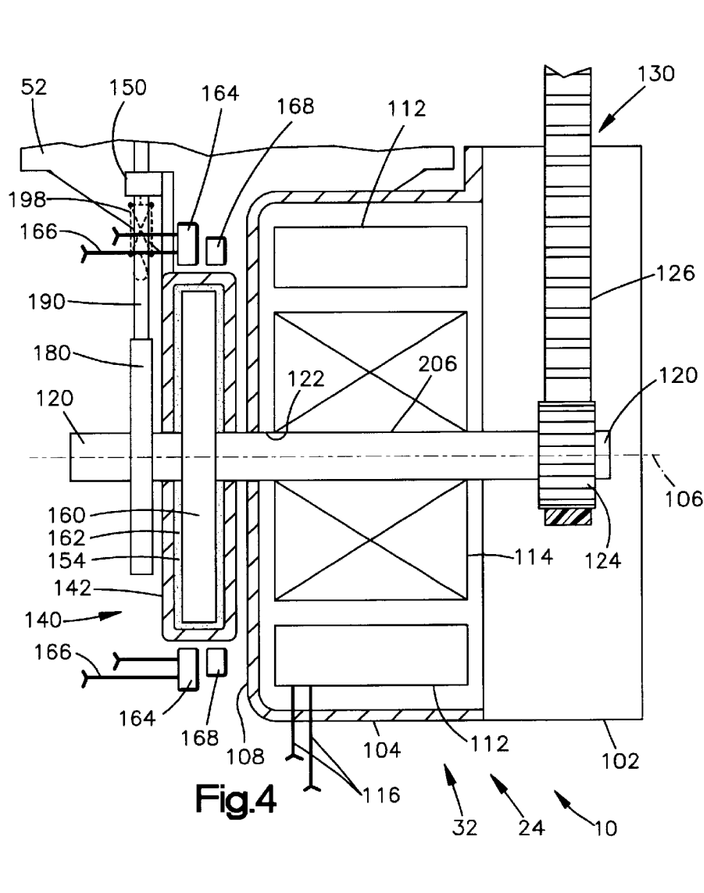
FIG. 4 is an enlarged schematic sectional view of a part of the retractor and pretensioner assembly of FIG. 2.

The drive assembly 100 also includes a cup-shaped motor housing 104 that is fixed to the drive housing 102 at a location spaced apart from the spool axis 64 (downward as viewed in FIGS. 2–4). The motor housing 102 has a cylindrical side wall 104 centered on a motor axis 106, and a circular end wall 108 that extends perpendicular to the motor axis. The motor axis 106 extends parallel to the spool axis 64.

The drive assembly 100 also includes an electric motor shown schematically at 110 in FIGS. 3 and 4. The motor 110 is enclosed and supported in the motor housing 102. The motor 110 is preferably a brushless DC motor and includes a stator 112 and a rotor 114. The stator 112 is rotationally fixed in the motor housing 102. The rotor 114 is rotatable about the motor axis 106 relative to the stator 112 in a known manner, upon the application of an electric current to the stator via lead wires 116.

The electric motor drive assembly 100 includes a motor output shaft 120 fixed for rotation with the rotor 114. The end wall 108 of the motor housing 104 has an opening 122 through which the motor output shaft 120 extends.

An externally toothed drive sprocket 124 is fixed on one end of the output shaft 120 within the drive housing 102. An internally toothed drive belt 126 is trained around the drive sprocket 124. The drive assembly 100 also includes an externally toothed driven sprocket 128 (FIG. 3). The driven sprocket 128 is fixed on the end of the retractor shaft 62, in a coaxial relationship with the spool 60. The drive belt 126 is trained over the driven sprocket 128.

The drive sprocket 124, the drive belt 126, and the driven sprocket 128 form a drive train 130 that connects the spool 60 with the motor 110 in a force-transmitting relationship. When the rotor 114 is caused to rotate by the application of electric current to the stator 112, the rotational force of the rotor is transmitted through the drive train 130 to the spool 60 to cause the spool to rotate in the belt retraction direction 66.

In the illustrated embodiment, the diameter of the drive sprocket 124 is one quarter of the diameter of the driven sprocket 128. The drive train 130 is thus configured to drive the spool 60 at a rate of one rotation about the spool axis 64 for every four rotations of the rotor 114 about the motor axis 106. That is, the drive train 130 provides a four to one gear reduction between the motor 110 and the spool 60.

The pretensioner 32 includes a brake 140. In the illustrated embodiment, the brake 140 is a magnetorheological brake. It should be understood that the brake could take another form, such as a disc brake or a drum brake.

The brake 140 includes a brake housing 142. The brake housing 142 has a hollow, disc-shaped configuration and is located axially outward of the motor housing 104 (that is, along the motor axis 106 in a direction away from the motor 110 and the drive train 130). The brake housing 142 is supported on the motor housing 104 or the base 50, in a manner not shown, for limited rotation about the motor axis 106 relative to the motor housing.

The brake housing 142 includes a cam 150 (FIG. 2). The cam 150 is a projecting portion of the brake housing 142 that is fixed for movement with the other parts of the brake housing. The cam 150 projects radially from the outer periphery of the brake housing 142, in a direction generally toward the retractor spool 60.

The brake housing 142 also includes a spring attachment arm 152 (FIG. 2). The spring attachment arm 152 is a projecting portion of the brake housing 142 that is fixed for movement with the other parts of the brake housing. The spring attachment arm 152 projects radially from the outer periphery of the brake housing 142, at a location spaced apart about ninety degrees circumferentially from the cam 150.

The brake housing 142 defines a chamber 154 (FIG. 4) in which a circular brake disc 160 is located. The brake disc 160 is fixed on the motor output shaft 120 and is thus rotatable with the rotor 114 upon actuation of the electric motor 110.

The chamber 154 in the brake housing 142 also contains a magnetorheological (MR) fluid 162. The MR fluid 162 fills the chamber 154 in the brake housing 142 and surrounds the brake disc 160. The MR fluid 162 is a known fluid that changes shear strength in response to changes in the magnetic field acting upon the fluid. Upon the application of a suitable magnetic field, the MR fluid 162 can have a shear strength great enough to couple the brake housing 142 for rotation with the brake disc 160.

The brake 140 includes an electromagnet shown schematically at 164 and disposed adjacent the brake housing 142. The electromagnet 164 is energizable over lead wires 166. The brake further includes a permanent magnet shown schematically at 168. The permanent magnet 168 is disposed adjacent the brake housing 142. Both the permanent magnet 168 and the electromagnet 164 may, as shown, encircle or extend around the brake housing 142.

The magnetic field generated by the permanent magnet 168 is strong enough to maintain the shear strength of the MR fluid 162 high enough to couple the brake housing 142 for rotation with the brake disc 160. The electromagnet 164 is selectively actuatable to generate a magnetic field that counteracts the field of the permanent magnet 168, thus decreasing the shear strength of the MR fluid 162 sufficiently to allow the brake disc 160 to rotate relative to and within the brake housing 142.

The pretensioner 32 further includes a housing spring 170 (FIGS. 2 and 3). The housing spring is a coil spring having a first end portion 172 connected with the base 50 and a second end portion 174 connected with the spring attachment arm 152 of the brake housing 142. The housing spring 170 is thus connected between, and acts between, the base 50 and the brake housing 142.

The location of the spring attachment arm 152 of the brake housing 142 is selected so that the housing spring 170 applies a biasing force to the brake housing to rotate the brake housing about the motor axis 106 in a counterclockwise direction as viewed in FIG. 2. The extent of this rotation of the brake housing 142 is limited by the engagement of a stop member 176 on the brake housing with a stop member 178 on the motor housing 104. In normal operation of the seat belt system 10, the stop member 176 on the brake housing 142 is in engagement with the stop member 178 on the motor housing 104, as shown in FIG. 2.

The pretensioner includes an intermediate mechanism, designated with the reference numeral 179, for transmitting force from the brake 140 to the lock pawl assembly 80. The intermediate mechanism 179 includes a synchro disc 180, a link 190, and a link spring 198.

The synchro disc 180 is a disc-shaped member having an outer peripheral surface 182. The synchro disc 180 is fixed to the output shaft 120 for rotation with the output shaft. Thus, the synchro disc 180 rotates in synchrony with the spool 60 and the ratchet wheel 74.

A plurality of teeth 184 are formed on the outer peripheral surface 182 of the synchro disc 180. The teeth 184 project radially outward from the outer peripheral surface 182. In the illustrated embodiment, four teeth 184 are provided, spaced apart at equal intervals around the periphery of the synchro disc 180.

The link 190 extends between the synchro disc 180 and the lock pawl assembly 80. The link 190 is a rigid member having a first end portion 192 pivotally connected with the link lever 86 of the lock pawl assembly 80. A second end portion 194 of the link 190 is located adjacent to and in the same plane as the synchro disc 190.

An intermediate portion 196 of the link 190 is connected with a first end portion of the link spring 198. The second end portion of the link spring 196 is fixed in position relative to the retractor base 50 and the motor housing 104, in a manner not shown. The link spring 198 is a compression spring that acts to pivot the link 190 in a direction that urges the second end portion 194 of the link toward the synchro disc 180, that is, to the right and downward as viewed in FIGS. 2, 5A and 5B.

The intermediate portion 196 of the link 190, in addition, is engageable with the cam 150 on the brake housing 142, as shown in FIG. 2. In this condition, the link spring 198 holds the link 190 against the cam 150 to help to control the pivotal position of the link.

As shown in FIG. 1, the vehicle occupant protection system 10 includes vehicle electric circuitry 200 for controlling operation of the motor 110 and the brake 140. The vehicle electric circuitry 200 includes one or more vehicle condition sensors 202. The sensors 202 may sense one or more vehicle conditions, such as sudden vehicle deceleration or the presence of an object in front of the vehicle, that could be used in making a "crash likely" determination in which it is desirable to actuate the pretensioner 32.

The vehicle electric circuitry 200 also and optionally includes one or more occupant condition sensors 204. The sensors 204 may sense one or more occupant conditions, such as occupant position relative to the vehicle seat back, that could be used in making a determination as to when it is desirable to actuate the pretensioner 32.

The vehicle electric circuitry 200 also includes a motor position sensor 206. The sensor 206 is an encoder on or formed as part of the motor 110. The motor position sensor 206 provides a signal that is indicative of the rotational speed and position of the rotor 114.

The vehicle electric circuitry 200 further includes a controller 210 (FIG. 1). The controller 210 preferably includes a microprocessor. The controller 210 is electrically connected to the electric motor 110 by the lead wires 116. The controller 210 also is electrically connected to the electromagnet 164 of the brake 140 by the lead wires 166. The controller 210 further is electrically connected to and receives signals from the sensors 202, 204 and 206.

In normal operation of the seat belt system 10, and particularly the retractor 30, the motor 110 is not energized, and the brake 140 is not actuated. The rewind spring assembly 70 controls retraction of the belt webbing 20 into the retractor 30 and thus controls tension on the belt webbing. As the spool 60 rotates under the influence of the rewind spring 70 and of forces applied to the belt webbing 20, the driven sprocket 128 rotates also. The driven sprocket 128 transmits rotational force through the drive belt 126 to the drive sprocket 124 and thereby to the motor shaft 120.

The motor shaft 120 rotates, and thus the rotor 114 and the brake disc 160 rotate also. Because the brake 140 is not actuated, the controller 210 maintains the electromagnet 164 in an energized condition. The magnetic field of the electromagnet 164 counteracts the field of the permanent magnet 168, decreasing the shear strength of the MR fluid 162 sufficiently to allow the brake disc 160 to rotate relative to the brake housing 142. As a result, the rotational force of the brake disc 160 is not transmitted through the MR fluid 162 to the brake housing brake housing 142, and the brake housing does not rotate.

At all times, the synchro disc 180 rotates with the motor shaft 120. During normal operation of the retractor 30, however, the cam 150 on the brake housing 142 holds the second end portion 194 of the link 190 away from the synchro disc 180. Therefore, the synchro disc 180 does not engage the link 190, and the rotational force of the synchro disc is not transmitted into and through the link to the lock pawl assembly 80. The lock pawl assembly 80 remains in the disengaged condition shown in FIG. 2, allowing the spool locking ratchet wheel 74, and the spool 60 as a whole, to rotate.

During operation of the vehicle 12, the controller 210 may determine that a condition exists for which it is desirable that any slack in the torso portion 42 of the seat belt webbing 20 be removed. For example, the controller 210 may receive signals from the vehicle condition sensor(s) 202 indicating that a vehicle crash is likely. Also, the controller 210 may determine that a condition exists for which it is desirable that the vehicle occupant be pulled back against the seat back portion 18 of the vehicle seat 14.

In either case, the controller 210 generates a first control signal for energizing the electric motor 110. That is, the controller causes the vehicle electric circuitry 200 to supply electric current to the electric motor 110 to rotate the rotor 114 and the motor shaft 120 about the motor axis 106. The rotational force of the motor shaft 120 is transmitted through the drive train 130 into the spool 60. The spool 60 rotates rapidly in the belt retraction direction 66 for a short period of time. The rapid rotation of the spool 60 retracts belt webbing 20 and produces a force on the belt webbing sufficient at least to remove any slack from the belt webbing, and also to pull an occupant 12 of the vehicle seat 14 to a position against the seat back portion 18.

At some point during the retraction of the belt webbing 20 when the seat belt is pulled snug against the occupant of the seat 14, the tension on the belt webbing increases to a level at which it matches the force applied by the motor 110. When this occurs, the motor 110 enters a stall condition. When the motor 110 is in the stall condition, the motor applies a predetermined amount of tension to the belt webbing 20, which is the same as the maximum amount that the motor can apply before it enters a stall condition. This amount depends on the construction of the motor 100, the amount of current applied to the motor, and other factors.

The occurrence of the motor 110 entering a stall condition is sensed by the controller 210 through the motor position sensor 206. Nevertheless, the controller 210 does not immediately turn the motor off, but instead causes power to continue to be applied to the motor 110, enough to maintain the predetermined amount of tension on the belt webbing 20. While the motor 110 continues in a stall condition, the torque of the motor 110 prevents belt withdrawal from the retractor 30.

If, thereafter, the controller 210 determines, on the basis of inputs from the sensors 202 and 204, that it is no longer necessary to apply tension to the belt webbing 20, the controller de-energizes the motor 110, taking load off the motor. When the motor 110 is de-energized, it ceases to apply force to the belt webbing 20 through the drive train 130 and the spool 60. Belt webbing 20 can be withdrawn from the retractor 30 without resistance from the motor 110.

As long as the motor 110 remains energized, however, a timer or clock circuit in the controller 210 helps the controller to keep track of how long the motor remains in the stall condition. After a predetermined period of time in which the motor 110 is energized and in a stall condition, preferably about one half second, the controller 210 is programmed to take the load off the motor by de-energizing it, to prevent overheating of the motor. This is done after first applying the brake 140.

Specifically, the controller 210 electrically actuates the brake 140. To do this, the electromagnet 164 is de-energized by stopping the flow of current over the lead wires 166. The de-energizing of the electromagnet 164 allows the magnetic field of the permanent magnet 168 to act on the MR fluid 162 unabated. The shear strength of the MR fluid 162 increases to a point at which the fluid prevents rotation of the brake disc 160 in the brake housing 142. As a result, the brake housing 142 is coupled for rotation with the brake disc 160, and the brake 140 is actuated, or locked.

While the brake 140 is in the actuated condition, the torque applied to the brake housing 142 by the housing spring 170 prevents the brake housing from rotating about the motor axis 106. Because the brake disc 160 is coupled to the brake housing 142, the brake disc also is prevented from rotating. Thus, the motor shaft 106 is prevented from rotating. At this time, then, the torque applied by the housing spring 170 is additive with the torque of the motor 110, in preventing withdrawal of seat belt webbing 20 from the retractor 30.

A predetermined period of time after the brake 140 is thus actuated, preferably about one half second, the controller 210 de-energizes the motor, thus taking all of the load off the motor. This can help to prevent overheating of the motor 110. The brake 140 remains actuated, preventing seat belt withdrawal from the retractor 30.

If the controller 210 thereafter determines that it is no longer necessary to maintain tension on the belt webbing 50 with the pretensioner 32, that is, to block seat belt withdrawal, the controller energizes the electromagnet 164 with a suitable current. The magnetic field generated by the electromagnet 164 overcomes the magnetic field of the permanent magnet 168, and the shear strength of the MR fluid decreases. The brake disc 160 is released for rotation relative to the brake housing 142. Because the brake disc 160 is fixed to the motor shaft 120, this allows the motor shaft to rotate, and, through the drive train 130, allows the spool 60 to rotate if the occupant attempts to withdraw the seat belt webbing 20.

It is possible that, at a time when the brake 140 is actuated, an increased load may be applied to the belt webbing 20. For example, the vehicle 12 may experience sudden deceleration, causing the vehicle occupant to move forward in the vehicle relative to the seat back portion 18. Such movement can rapidly place a large tensile force on the belt webbing 20. Such increased tensile force on the seat belt 20 is transmitted through the spool 60 and the drive train 130 to the motor 110. As a result, the torque acting on the motor shaft 120 from the belt webbing 20, increases attempting to rotate the motor shaft about the motor axis 106. The torque on the motor shaft 120 is transmitted through the brake disc 160 and the MR fluid 162 into the brake housing 142.

If the tensile force on the belt webbing 20 is high enough in this condition, the torque on the motor shaft 120 and the brake housing 142 exceeds the pre-load of the housing spring 170. As a result, the housing spring 170 begins to extend, and the brake housing 142, the brake disc 160, the motor shaft 120, and the synchro disc 18 begin to rotate about the motor axis 106, under force applied from the belt webbing 20 through the spool 60 and the drive train 130.

If force on the belt webbing 20 becomes high enough, the housing spring 170 extends enough so that continued rotation of the brake housing 142 moves the cam 150 away from the link 190. The link 190, under the influence of the link spring 198, moves into engagement with the outer peripheral surface 182 of the rotating synchro disc 180. Still further rotation of the brake housing 142 and synchro disc 180 caused by addition of withdrawal of seat belt 20, causes one of the teeth 184 on the synchro disc to engage the second end portion 194 of the link 190.

Figure 5A:
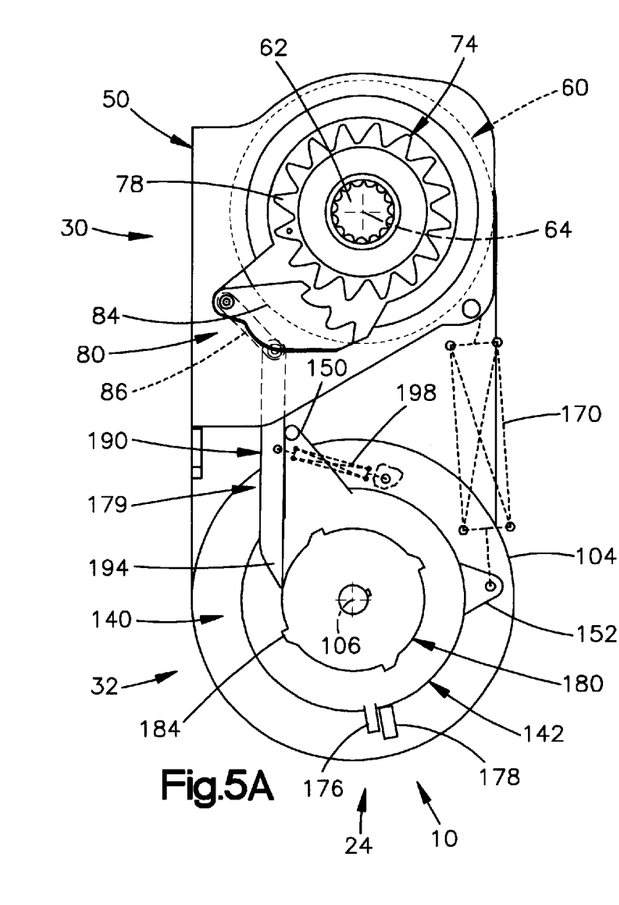
FIGS. 5A and 5B are views similar to FIG. 2 showing parts of the retractor and pretensioner assembly in different positions.
Figure 5B:
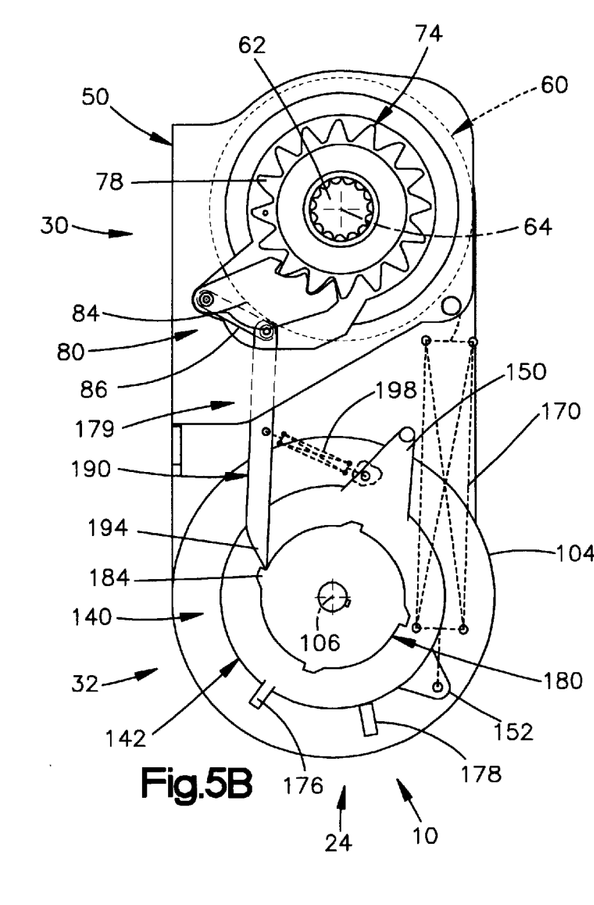

The rotational force of the synchro disc 190 is transmitted to the link 190 and results in generally linear movement of the link, in an upward direction as viewed in FIGS. 2, 5A and 5B. The force of the upward movement of the link 190 is transmitted through the link lever 86 into the cross bar 82, and causes the lock pawl assembly 80 to pivot about the axis 88. The lock pawl 84 moves into engagement with the spool locking ratchet wheel 74 on the spool 60. Rotation of the spool 60 in the belt withdrawal direction 68 is blocked, and withdrawal of belt webbing 20 from the retractor 30 ceases. The force that is applied through the belt webbing 20 is sufficient to cause the retractor 30 to lock in this manner. No added (outside) force is needed, such as a pyrotechnic device.

The internally toothed drive belt 126 provides a direct mechanical connection, without slippage, between the spool 60 (and the ratchet wheel 74) and the motor shaft 120. The synchro disk 180 is fixed for rotation with the motor shaft 120. As a result, there is a direct mechanical connection, without slippage, between the ratchet wheel 74 and the synchro disk 180. Therefore, the mechanical parts of the retractor and pretensioner assembly 24 can be arranged for sychronous rotation, or timed, so that the lock pawl 84 smoothly engages the ratchet wheel 74.

It can be seen that the pretensioner 32 sequentially applies several levels of resistance to withdrawal of the belt webbing 20. At the first level, the motor 110 provides retractive or tensioning force, which may be up to about 250 Newtons, for example. At the next level, the housing spring 170 applies tensioning force (resistance to belt withdrawal), when coupled via the actuated brake 140 with the motor 110 being de-energized. The housing spring 170, without extending from its installed length, can maintain the webbing tension that is applied by the motor 110. For example, webbing load up to 275 Newtons can be resisted without extending the housing spring 170 from its installed length. At the next level, webbing load of greater than 275 Newtons causes the housing spring 170 to extend, therefore allowing the brake housing 142 to rotate. At the last level, for example, at approximately 325 Newtons, the housing spring 170 is extended enough to allow sufficient rotation of the brake housing 142 to cause lock up of the retractor 30.

If the tensile force on the belt webbing 20 is released at a time when the retractor 30 is locked, the force controlling the rotational position of the parts of the assembly 24 comes from the housing spring 170. The force applied by the extended housing spring 170 acts through the brake housing 142 to attempt to rotate the brake disc 160 (and also the motor shaft 120, because the brake 140 remains actuated). The rotational force of the motor shaft 120 is transmitted through the drive train 130 into the spool 60, causing the spool to rotate in the belt retraction direction 66.

When the controller 210 determines that a "crash likely" condition no longer exists, the controller 210 de-actuates the brake 140, and de-energizes the motor 110 if it is energized at the time. As a result, the brake housing 142 is no longer coupled for rotation with the brake disc 160. The force applied by the housing spring 170 rotates the brake housing 142 back toward its starting position. The tooth 184 on the synchro disc 180 moves downward, away from the link 190. At the same time, the cam 150 on the brake housing 142 engages the link 190 and pushes the link laterally away from the synchro disc 180. The link 190 is free of engagement with the synchro disc 180.

The biasing force of the link spring 198 pulls the link 190, and the lock pawl assembly 80, away from the ratchet wheel 74. The spool 60 is free to rotate under the influence of the rewind spring 70. All the parts of the retractor 30 and the pretensioner 32 return to their starting positions under the influence of the link spring 198, the housing spring 170 and gravity. The parts of the pretensioner 32 and the retractor 30 are then in their normal condition of operation, as shown in FIG. 2.

If the controller 210 determines that a "crash likely" condition exists at a time when the motor 110 is not already energized, the brake 140 is actuated immediately, without energizing the motor. Any further occupant withdrawal of seat belt 20 thereafter causes the motor shaft 120 to be rotated, through the drive train 130. The brake housing 142 is coupled for rotation with the motor shaft 120 because the brake 110 is actuated. The brake housing 142 rotates, and, as described above, the lock pawl 84 moves into engagement with the spool locking ratchet wheel 74, and the retractor 30 locks as described above.

In the event of a power failure, the electromagnet 164 can not be energized. The magnetic field of the permanent magnet 168 acts on the MR fluid 162 in the brake 140 unabated, causing the brake to be actuated. Sufficient occupant withdrawal of seat belt webbing 20 thereafter causes the retractor 30 to lock as described above.

Figure 6:
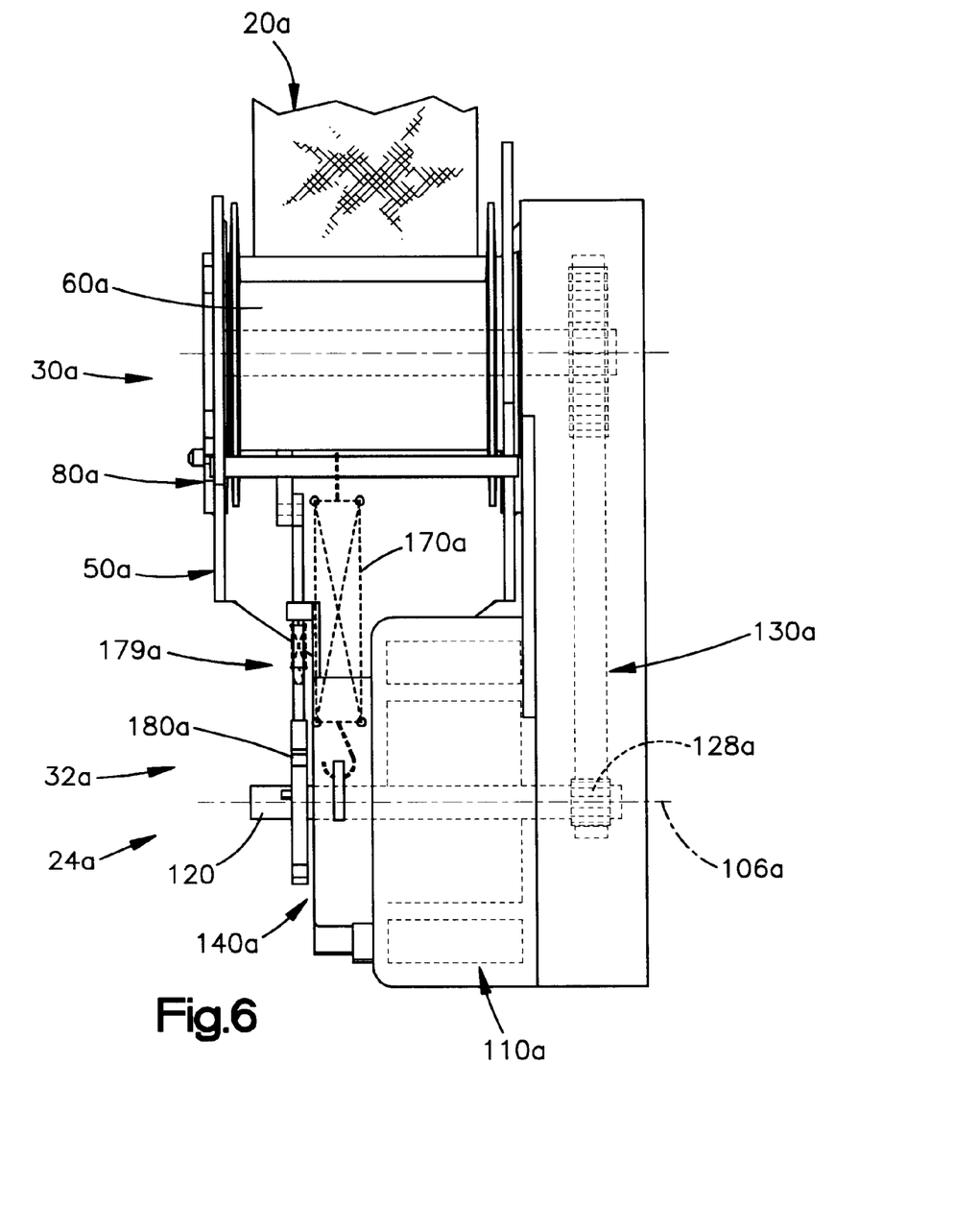
FIG. 6 is a view similar to FIG. 3 of a retractor and pretensioner assembly in accordance with a second embodiment of the invention.

FIG. 6 illustrates a retractor and pretensioner assembly 24a in accordance with a second embodiment of the invention. The retractor and pretensioner assembly 24a is almost identical in construction to the retractor and pretensioner assembly 24 (FIGS. 1–5), and parts that are the same are given the same reference numerals with the suffix "a" attached.

In the assembly 24a, the retractor 30a does not include a rewind spring. Instead, the electric motor 11a is operative in a known manner to retract belt webbing 20a in normal operation of the retractor 30a. The electric motor 110a may additionally be operative, in a known manner, to pay out belt webbing 20a during normal operation of the retractor 30a.

Specifically, upon an increase of tension on the belt webbing 30a, the spool 60a rotates against the resistive force of the drive train 130a including the electric motor 110a, to allow belt webbing to be withdrawn (paid out) from the retractor 30a. When the tension on the belt webbing 20a is released, the controller (not shown) energizes the electric motor 110a. The force applied by the electric motor 110a acts through the drive train 130a to rotate the spool 60a in the belt retraction direction, and belt webbing 20a is retracted into the retractor 30a. When sufficient belt webbing 20a is retracted, the motor 110a is de-energized. Pretensioning operation of the assembly 24a is similar to that of the assembly 24, with the motor 110a and the brake 140a cooperating to pretension the belt webbing and lock the retractor.

FIGS. 7 and 8A–8C illustrate a retractor and pretensioner assembly 24b in accordance with a third embodiment of the invention. The retractor and pretensioner assembly 24b is similar in construction to the retractor and pretensioner assembly 24 (FIGS. 1–5), and parts that are the same or similar are given the same reference numerals with the suffix "b" added. The assembly 24b, like the assembly 24, includes a rewind spring 70b and an electric motor 10b that is operative to retract belt webbing only during pretensioning, not during normal operation of the retractor 30b. In the assembly 24b, however, a flexible link 230 takes the place of the synchro disc 180 and the rigid link 190.

Figure 7:
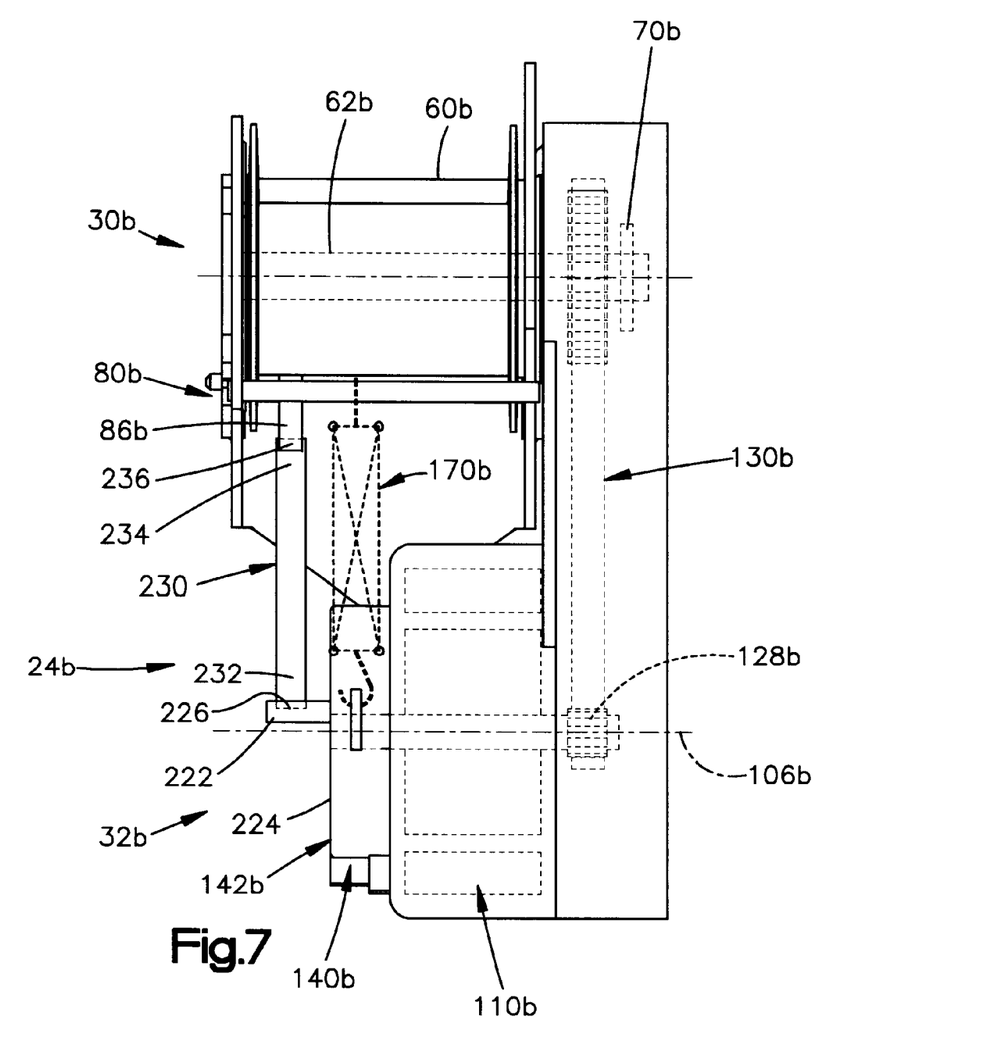
FIG. 7 is a view similar to FIG. 3 of a retractor and pretensioner assembly in accordance with a third embodiment of the invention.

Specifically, the brake housing 142b of the assembly 24b includes a link support 222. The link support 222 is located on the outer surface of a circular end wall 224 of the brake housing 142b. The link support 222 has a U-shaped configuration with the notch 226 presented generally upward, toward the lock pawl assembly 80b.

The link 230 extends between the link support 222 on the brake housing 142b and the lock pawl assembly 80b. The link 230 is a flexible, resilient, strip-like member, preferably made from metal or plastic, having a first end portion 232 received in the notch 226 in the link support 222 on the brake housing 142b, and a second end portion 234 in a notch 236 in the link lever 86b of the lock pawl assembly 80b.

The retractor shaft 62b is fixed for rotation with the driven sprocket 128b.

When the controller determines that a "crash likely" condition exists, the brake 140b is actuated. Tensile force from the seat belt 20b acts through the spool 60b, the retractor shaft 62b, and the drive train 130b to rotate the motor shaft 120b. The rotational force of the motor shaft 120b is transmitted through the actuated brake 140b to the brake housing 142b. The brake housing 142b rotates about the motor axis 106b.

When the brake housing 142b rotates, the link support 222 moves in an arc centered on the axis 106b, and transmits its rotational force to the link 230. The moving link 230 transmits force through the link lever 86b and the cross bar 82b into the lock pawl 84b. The lock pawl 84b pivots toward the ratchet wheel 74.

Figure 8A:
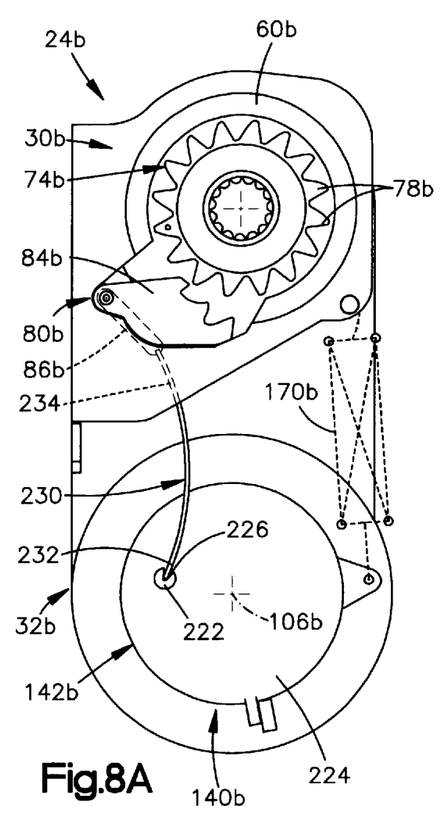
FIGS. 8A–8C are side elevational views showing parts of the retractor and pretensioner assembly of FIG. 7 in different positions.
Figure 8B:
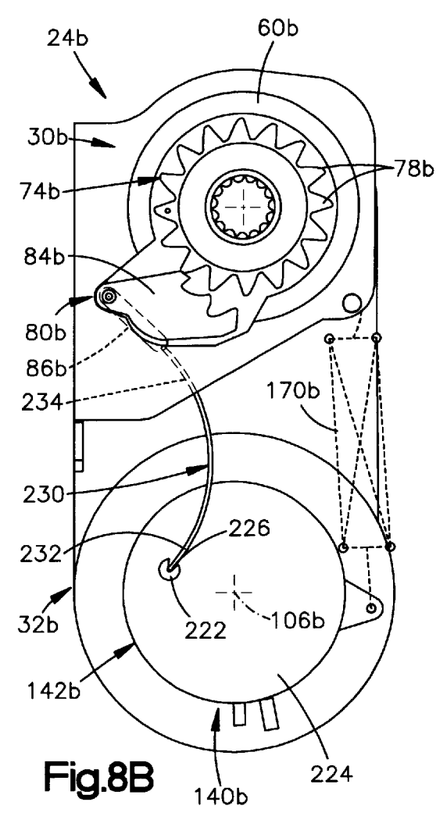
Figure 8C:
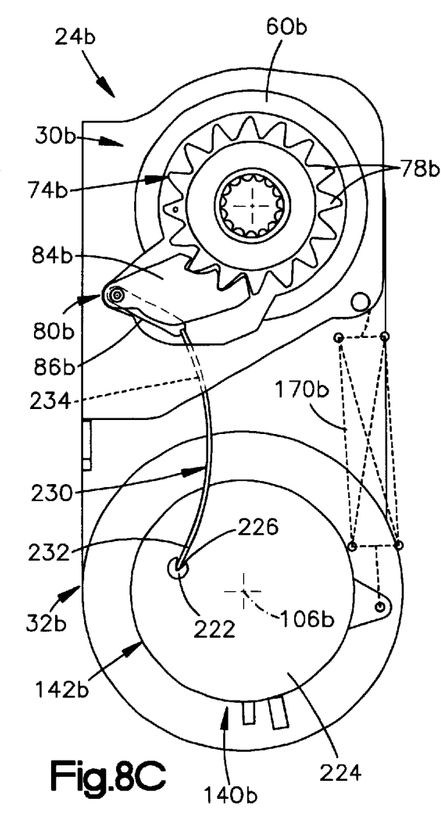

The ratchet wheel 74b may be in a rotational position in which each tooth on the lock pawl 84b can move immediately into position between the adjacent teeth 78b on the ratchet wheel, as shown in FIG. 8C. In this case, the force transmitted from the brake housing 142b through the link 230 into the lock pawl assembly 80b causes the lock pawl 84b to move immediately into locking engagement with the ratchet wheel 74b. As a result, the spool 60b is blocked from rotation in the belt withdrawal direction, and the retractor 20b is thus locked.

On the other hand, the ratchet wheel 74b may be in a rotational position in which each tooth on the lock pawl 84b can not move immediately into position between two adjacent teeth 78b on the ratchet wheel, as shown in FIG. 8B. In this case, one of the teeth on the lock pawl 84b may engage a radially outer portion of a tooth 78b on the ratchet wheel 74b, so that the lock pawl does not fall into locking engagement unless the ratchet wheel rotates further.

If this occurs, the ratchet wheel 74b and the brake housing 142b continue to rotate while the lock pawl 84b does not move significantly. In an embodiment in which there is a four to one reduction provided by the drive train 130b, the brake housing 142b rotates four times for each rotation of the ratchet wheel 74b. Thus, if the ratchet wheel 74b has sixteen teeth as illustrated, the brake housing 142b may need to rotate up to 45 degrees or more before the lock pawl 84b moves from a position on the tip of the ratchet wheel tooth 78b into a position in locking engagement with the ratchet wheel.

During this time period of extended rotation of the brake housing 142b, the link 230 flexes, assuming a more bowed configuration as shown in FIG. 8B, because the first end portion 232 of the link 230 is moved relative to the second end portion 234. When the ratchet wheel 74b rotates far enough, however, the lock pawl 84b is urged into locking engagement with the ratchet wheel by the spring force of the link 230. The link 230 extends back to its original configuration as shown in FIG. 8C. The spool 60b is blocked from rotation in the belt withdrawal direction, and the retractor 30b is locked.

Thus, it can be seen that the pretensioner 32b of FIGS. 7 and 8A–8C provides a resilience, or flexibility, in the intermediate mechanism between the brake 140b and the lock pawl 84b, that is needed if the brake housing 142b is not timed for rotation with the spool 60b. In the pretensioner 32b, the resilient member is the link 230. The spring force exerted by the link 230 has to overcome the inertia of the entire lock pawl assembly 80b, including the lock pawl 84b, the cross bar (not shown) and the link 86b, in a very short period of time, in order to go from the disengaged position shown in FIG. 8B to the engaged position shown in FIG. 8C.

To decrease the amount of inertia that has to be overcome by spring force, the spring may be provided elsewhere in the intermediate mechanism than in the link itself, in a pretensioner in accordance with the present invention. Specifically, a lock pawl assembly may be provided that comprises two pieces, the lock pawl itself and the cross bar, having a torsion spring acting between them. The two parts of the lock pawl assembly would normally move together under force transmitted from the brake through a rigid link. In the event the lock pawl does not immediately fall into locking engagement with the ratchet, the rigid link and the cross bar would continue to move relative to the ratchet under force applied by the brake. The torsion spring would twist to allow the lock pawl to stay in place against the ratchet, while the rigid link and the cross bar move, until the ratchet rotated enough to allow the lock pawl to fall into locking engagement with the ratchet. In such a pretensioner assembly, the spring would need to move only the lock pawl to go from the position shown in FIG. 8B to the position shown in FIG. 8C, thus lessening the amount of inertia that has to be overcome by spring force.

From the above description of the invention, those skilled in the art will perceive improvements, changes and modifications in the invention. For example, any embodiment of the invention may omit the rewind spring and use the electric motor to retract belt webbing, as in the embodiment of FIG. 6. Such improvements, changes and modifications within the skill of the art are intended to be covered by the appended claims.

Having described the invention, I claim:

1. Apparatus for helping to protect an occupant of a vehicle seat, comprising:
    a seat belt;
    a seat belt retractor including a spool supported for rotation about a spool axis in a seat belt withdrawal direction and an opposite seat belt retraction direction;
    an electric motor energizable to rotate said spool in the seat belt retraction direction and de-energizable, said electric motor being energizable to rotate said spool in the seat belt retraction direction to apply a predetermined amount of tension to said seat belt; and
    an electrically actuatable brake associated with said motor, said brake being actuatable to maintain the predetermined amount of tension on said seat belt after said motor applies the predetermined amount of tension to said seat belt.

2. Apparatus as set forth in claim 1 further comprising a blocking mechanism for blocking rotation of said spool in said seat belt withdrawal direction, said blocking mechanism being actuatable if the tension on said seat belt exceeds said predetermined amount when said brake is in an actuated condition.

3. Apparatus as set forth in claim 2 wherein said blocking mechanism comprises a ratchet wheel fixed for rotation with said spool, a lock pawl movable into engagement with said ratchet wheel to block rotation of said spool in the seat belt withdrawal direction, and an intermediate mechanism for transmitting force from said brake to said lock pawl to move said lock pawl into engagement with said ratchet wheel.

4. Apparatus as set forth in claim 3 wherein said brake includes a member rotatable under force applied from said seat belt through said motor if the tension on said seat belt exceeds said predetermined amount when said brake is in an actuated condition, rotation of said brake member transmitting force from said brake through said intermediate mechanism to said lock pawl to move said lock pawl into engagement with said ratchet wheel to block rotation of said spool in said seat belt withdrawal direction.

5. Apparatus as set forth in claim 4 wherein said intermediate mechanism comprises a link connected with said lock pawl, said brake member being engageable with said link to move said link and thereby move said lock pawl.

6. Apparatus as set forth in claim 1 including vehicle electric circuitry operative to actuate said brake at a predetermined period of time after said electric motor is energized.

7. Apparatus as set forth in claim 1 including vehicle electric circuitry operative to sense a stall condition of said electric motor, and wherein said brake is electrically actuatable in response to said vehicle electric circuitry sensing a stall condition of said electric motor.

8. Apparatus as set forth in claim 1 including vehicle electric circuitry operative to sense a stall condition of said electric motor, said brake being electrically actuatable in response to said vehicle electric circuitry sensing a predetermined period of time of a stall condition of said electric motor, said vehicle electric circuitry being operative to de-energize said electric motor after actuation of said brake.

9. Apparatus as set forth in claim 1 comprising:
    a drive train connected between said motor and said spool for transmitting rotational force from said motor to said spool and from said spool to said motor;
    a lock pawl movable into a position for blocking rotation of said spool in the seat belt withdrawal direction; and
    an intermediate mechanism connected between said brake and said spool for moving said lock pawl into said position for blocking rotation of said retractor spool in said seat belt withdrawal direction.

10. Apparatus as set forth in claim 1 comprising means for generating a first control signal for energizing said motor and a second control signal for actuating said brake.

11. Apparatus as set forth in claim 1 wherein said brake is rotatable in response to seat belt withdrawal after actuation of said brake, said apparatus comprising biasing means for resisting rotation of said brake, said apparatus further comprising a part movable in response to rotation of said brake to block rotation of said retractor spool in said seat belt withdrawal direction.

12. Apparatus as set forth in claim 1 wherein said motor comprises a rotor and a motor shaft that are rotatable together, said motor shaft being coupled for rotation with said spool, said brake comprising a rotatable member fixed for rotation on said motor shaft with said rotor, said brake further comprising an electrically actuatable mechanism for, when actuated, preventing rotation of said rotatable member and thereby preventing rotation of said motor shaft and said spool.

13. Apparatus as set forth in claim 12 wherein said brake comprises a member rotatable with said spool, said member being disposed in a housing, said member being rotatable relative to said housing when said brake is unactuated, said housing being coupled for rotation with said member when said brake is actuated.

14. Apparatus as set forth in claim 13 comprising an intermediate mechanism responsive to rotation of said brake housing to block rotation of said retractor spool in said seat belt withdrawal direction.

15. Apparatus as set forth in claim 14 wherein said intermediate mechanism comprises a rigid link having a first end portion for receiving rotational force from said brake housing and a second end portion for moving a member to block rotation of said retractor spool in said seat belt withdrawal direction.

16. Apparatus as set forth in claim 14 wherein said intermediate mechanism comprises a resilient member having a first portion for receiving rotational force from said brake housing and a second portion for moving a member to block rotation of said retractor spool in said seat belt withdrawal direction.

17. Apparatus as set forth in claim 1 wherein said motor comprises a rotor, said brake comprising a fluid changeable to couple a member for rotation with said rotor thereby to block rotation of said retractor spool in said seat belt withdrawal direction in response to withdrawal of seat belt from said retractor after actuation of said brake.

18. Apparatus as set forth in claim 1 comprising a spool locking mechanism actuatable, in response to withdrawal of seat belt from said spool after actuation of said brake, by force transmitted from said seat belt through said brake.

19. Apparatus as set forth in claim 18 wherein said brake is rotatable by said force transmitted from said seat belt through said brake to effect actuation of said spool locking mechanism.

20. Apparatus for helping to protect an occupant of a vehicle seat, comprising:

a seat belt;

a seat belt retractor including a spool supported for rotation about a spool axis in a seat belt withdrawal direction and an opposite seat belt retraction direction;

a pretensioner energizable to rotate said spool in the seat belt retraction direction to apply a predetermined amount of tension to said seat belt;

a first mechanism to maintain the predetermined amount of tension on said seat belt after said pretensioner applies the predetermined amount of tension to the seat belt; and a second mechanism to block rotation of said spool in said seat belt withdrawal direction, said second mechanism being actuatable if the tension on said seat belt exceeds said predetermined amount.

21. Apparatus as set forth in claim 20 wherein said pretensioner comprises an electric motor energizable to rotate said spool in the seat belt retraction direction to apply said predetermined amount of tension to said seat belt, said first mechanism comprising a brake electrically actuatable to block rotation of said spool in the seat belt retraction direction after said electric motor applies said predetermined amount of tension to said seat belt.

22. Apparatus as set forth in claim 21 comprising vehicle electric circuitry for actuating said brake a predetermined period of time after said electric motor applies said predetermined amount of tension to said seat belt, and vehicle electric circuitry for de-energizing said electric motor a predetermined period of time after actuation of said brake.

23. Apparatus as set forth in claim 22 wherein said brake includes a member rotatable in response to the tension on said seat belt exceeding said predetermined amount, rotation of said member causing actuation of said second mechanism.

24. Apparatus as set forth in claim 23 wherein said second mechanism comprises biasing means for resisting rotation of said member when said brake is actuated, said member rotating against the bias of said biasing means if the tension on said seat belt exceeds said predetermined amount, said second mechanism further comprising a part movable in response to rotation of said member to block rotation of said retractor spool in said seat belt withdrawal direction.

25. Apparatus as set forth in claim 24 wherein said part movable in response to rotation of said member comprises a lock pawl movable into engagement with a ratchet wheel to block rotation of said spool in the seat belt withdrawal direction.

26. Apparatus as set forth in claim 20 wherein said second mechanism comprises a ratchet wheel fixed for rotation with said spool and a lock pawl movable into engagement with said ratchet wheel to block rotation of said spool in the seat belt withdrawal direction in response to the tension on said seat belt exceeding said predetermined amount.

27. Apparatus as set forth in claim 20 wherein said second mechanism is actuatable in response to withdrawal of said seat belt from said spool after actuation of said first mechanism, by force transmitted from said seat belt through said first mechanism.

28. Apparatus as set forth in claim 27 wherein said first mechanism is a brake rotatable by said force transmitted from said seat belt through said brake to effect actuation of said spool locking mechanism.

29. Apparatus as set forth in claim 28 comprising biasing means for resisting rotation of said brake when said brake is actuated, said brake rotating against the bias of said biasing means if the tension on said seat belt exceeds said predetermined amount.

30. Apparatus for helping to protect an occupant of a vehicle seat, comprising:

a seat belt;

a seat belt retractor including a spool supported for rotation about a spool axis in a seat belt withdrawal direction and an opposite seat belt retraction direction;

an electric motor energizable to rotate said spool in the seat belt retraction direction and de-energizable, said electric motor being energizable to rotate said spool in the seat belt retraction direction to apply a predetermined amount of tension to said seat belt; and a brake for preventing rotation of a shaft of said motor, said brake comprising a magnetorheological fluid.

31. Apparatus as set forth in claim 30 wherein said brake is electrically actuatable to maintain the predetermined amount of tension on said seat belt after said motor applies the first predetermined amount of tension to said seat belt.

32. Apparatus as set forth in claim 30 wherein said motor comprises a rotor, said magnetorheological fluid being changeable to couple a member for rotation with said rotor thereby to block rotation of said retractor spool in the seat belt withdrawal direction in response to withdrawal of seat belt from said retractor after actuation of said brake.

33. Apparatus as set forth in claim 30 including vehicle electric circuitry operative to actuate said brake at a predetermined period of time after said electric motor is energized, actuation of said brake resulting in a change in shear strength of said magnetorheological fluid.

34. Apparatus as set forth in claim 30 including vehicle electric circuitry operative to sense a stall condition of said electric motor, and wherein said brake is electrically actuatable in response to said vehicle electric circuitry sensing a stall condition of said electric motor, actuation of said brake resulting in a change in shear strength of said magnetorheological fluid.

35. Apparatus as set forth in claim 30 including vehicle electric circuitry operative to sense a stall condition of said electric motor, said brake being electrically actuatable in response to said vehicle electric circuitry sensing a predetermined period of time of a stall condition of said electric motor, said vehicle electric circuitry being operative to de-energize said electric motor after actuation of said brake.

36. Apparatus as set forth in claim 30 comprising:

a drive train connected between said motor and said spool for transmitting rotational force from said motor to said spool and from said spool to said motor;

a lock pawl movable into a position for blocking rotation of said spool in the seat belt withdrawal direction in response to actuation of said brake; and an intermediate mechanism connected between said brake and said spool for moving said lock pawl into said position for blocking rotation of said retractor spool in said seat belt withdrawal direction.

37. Apparatus as set forth in claim 30 wherein said brake comprises a permanent magnet operative to maintain said magnetorheological fluid in a condition in which said brake is actuated, and an electromagnet selectively energizable to change said magnetorheological fluid to de-actuate said brake.

38. Apparatus as set forth in claim 37 wherein said brake is maintained in the actuated condition in the event of a power failure to said electromagnet.

* * * * *